Oct. 31, 1944.  C. A. FINK  2,361,757
FLUID PRESSURE OPERATED DEVICE
Filed May 17, 1943  3 Sheets-Sheet 1
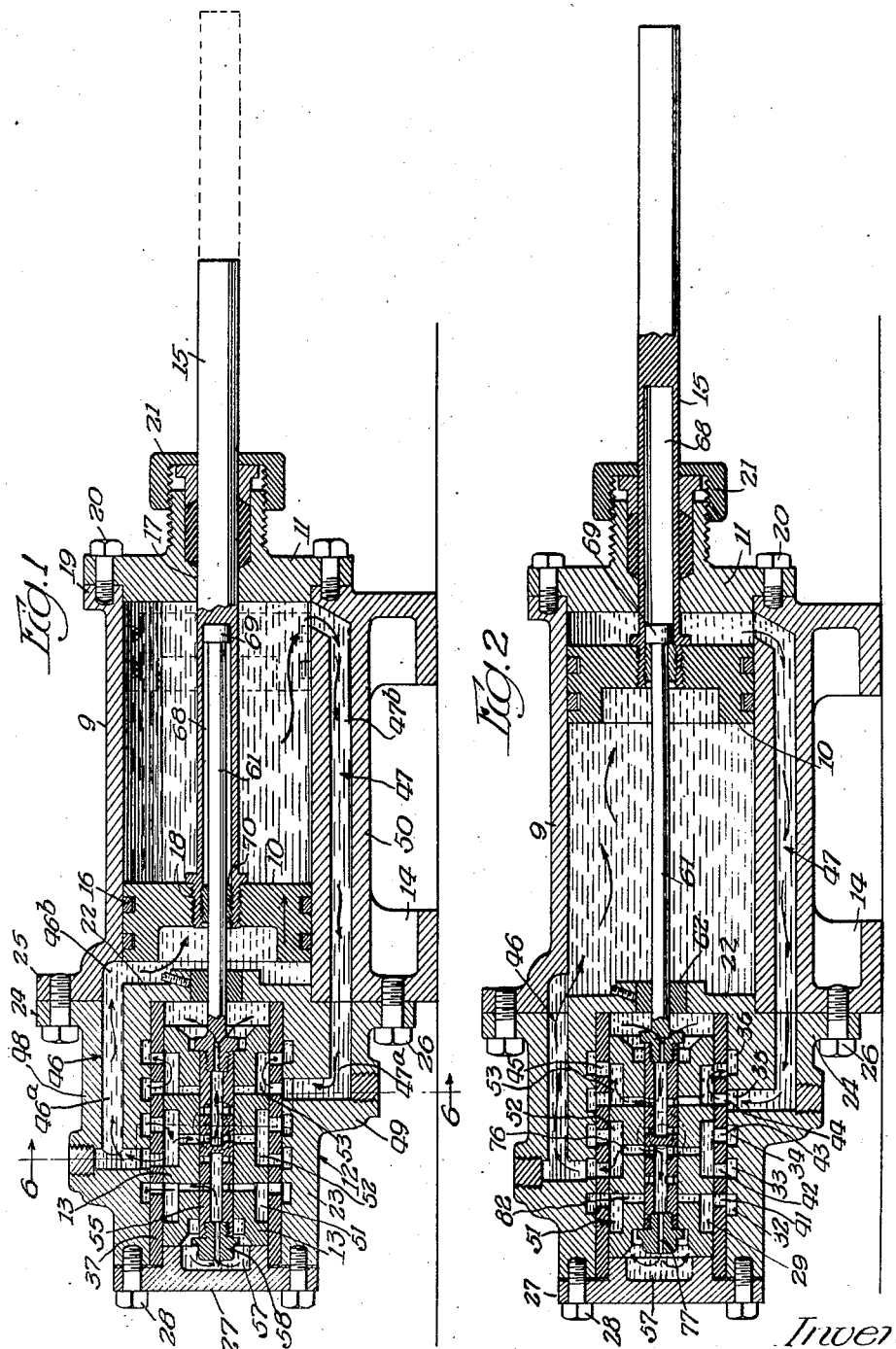
Inventor
Charles A. Fink
By Fred Gerlach
Atty.

Oct. 31, 1944.                C. A. FINK                2,361,757
FLUID PRESSURE OPERATED DEVICE
Filed May 17, 1943                3 Sheets-Sheet 2
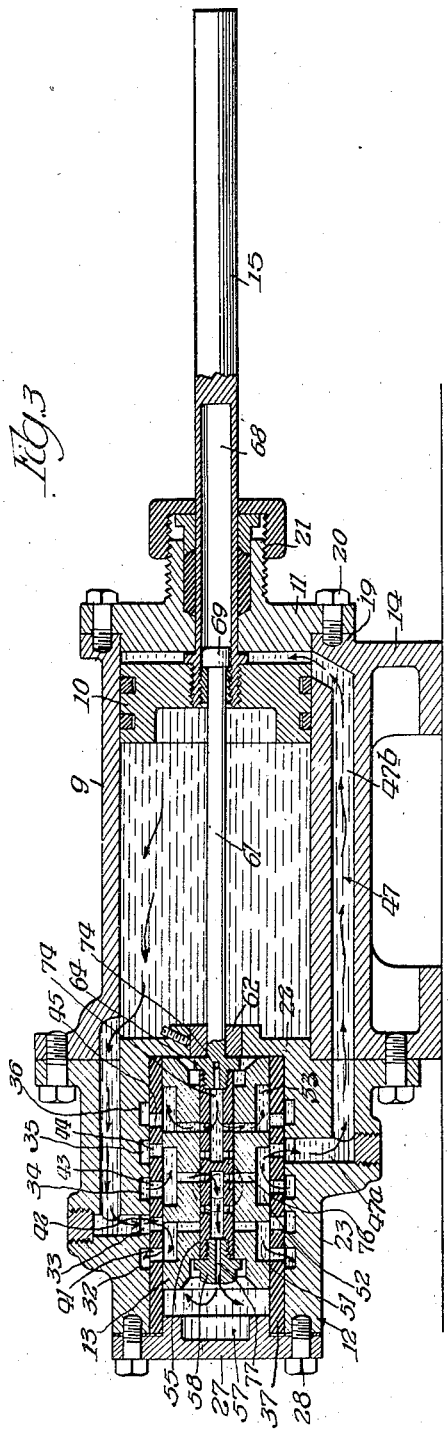
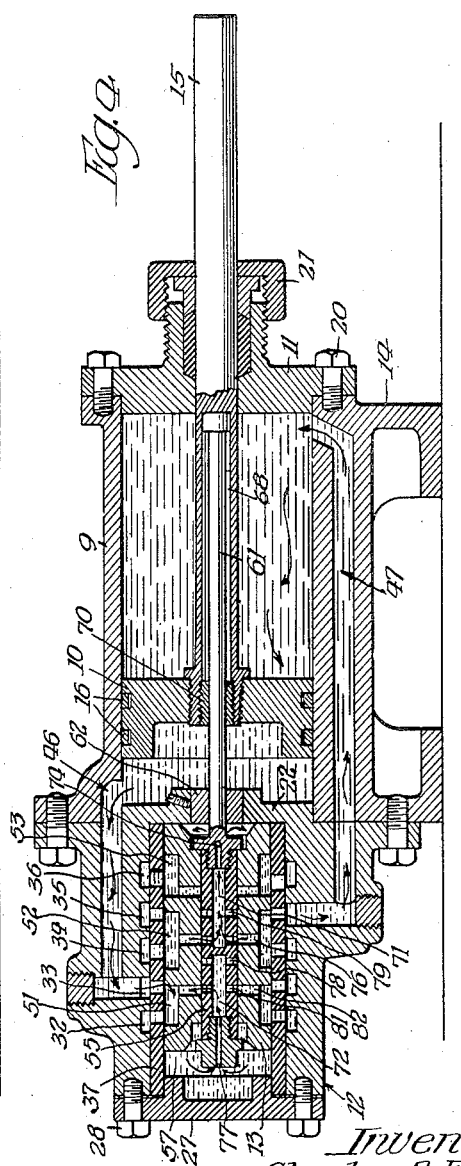
Inventor
Charles A. Fink
By Fred Gerlach Atty.

Oct. 31, 1944.   C. A. FINK   2,361,757
FLUID PRESSURE OPERATED DEVICE
Filed May 17, 1943   3 Sheets-Sheet 3
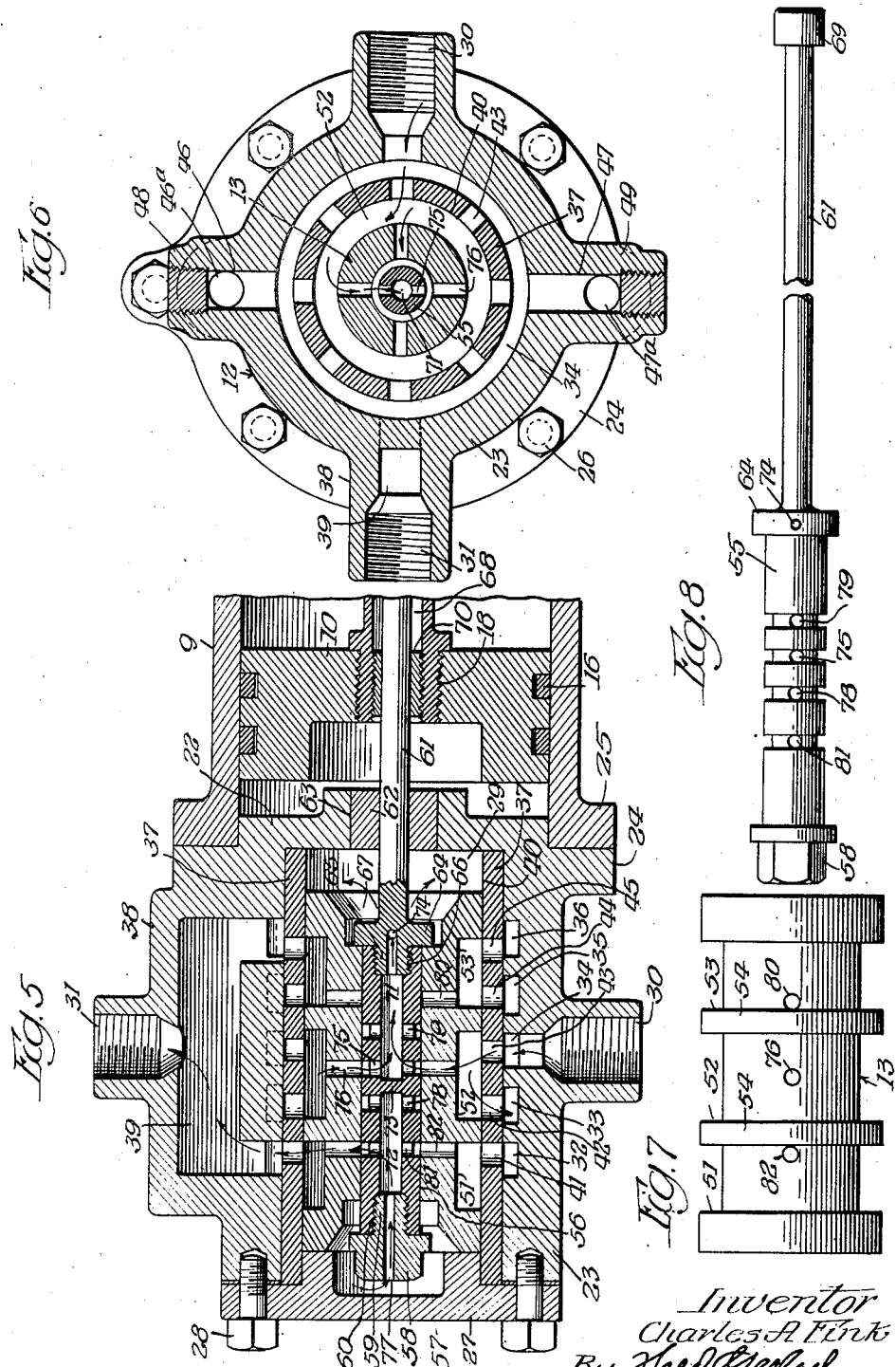
Inventor
Charles A. Fink Patented Oct. 31, 1944

2,361,757

UNITED STATES PATENT OFFICE 2,361,757

FLUID PRESSURE OPERATED DEVICE

Charles A. Fink, Chicago, Ill.

Application May 17, 1943, Serial No. 487,329

1 Claim. (Cl. 121—157)

The present invention relates generally to fluid pressure operated devices. More particularly the invention relates to that type of device which operates to translate the pressure of the fluid into reciprocating movement and comprises a cylinder with a head at one end thereof, a valve supporting head fitting against the other end of the cylinder and having a fluid inlet and a fluid outlet, a piston in the cylinder with a rod therefor extending slidably through the first mentioned cylinder head, means forming a duct leading from the valve supporting head to one end of the cylinder and a second duct leading from the last mentioned head to the other end of the cylinder, and a plunger type valve which is slidably mounted in the valve supporting head and operates when shifted into one position to connect one of the ducts to the inlet and the other duct to the outlet in order to cause shift of the piston from one end of the cylinder to the other and operates when shifted into its other position to connect the other duct to the inlet and the one duct to the outlet in order to cause shift of the piston towards the other end of the cylinder.

One object of the invention is to provide a fluid pressure operated device of this type which is generally an improvement upon, and is more efficient than, previously designed devices of the same general character.

Another object of the invention is to provide a device of the type under consideration in which the plunger-type valve is shifted back and forth for piston controlling purposes by way of a portion of the fluid under pressure entering the valve supporting head via the inlet and such portion of the fluid is controlled by way of a pilot valve which is slidably mounted in the plunger-type valve and is connected by way of a lost motion connection to the piston rod so that it is shiftable from one position to the other at the end of each stroke of the piston.

A further object of the invention is to provide a fluid pressure operated device of the last mentioned type and character in which the valve arrangement is such that the main or plunger-type valve remains in either of its shifted positions until shift of the pilot valve by the piston rod and as a result the piston rod is always subjected to motion or shift when fluid under pressure is delivered to the inlet and cannot under any circumstances assume a dead center position.

A still further object of the invention is to provide a fluid pressure operated device of the type and character under consideration in which the plunger type and pilot valves are so arranged and designed that the fluid under pressure to which the sides thereof are subjected is uniformly distributed with the result that such valves are not subjected to any binding or sticking.

Other objects of the invention and the various advantages and characteristics of the present fluid pressure operated device will be apparent from a consideration of the following detailed description.

The invention consists in the several novel features which are hereinafter set forth and are more particularly defined by the claim at the conclusion hereof.

In the drawings which accompany and form a part of this specification or disclosure and in which like numerals of reference denote corresponding parts throughout the several views:

Figure 1 is a vertical longitudinal sectional view of a fluid pressure operated device embodying the invention, showing the piston at one end of the cylinder and the main or plunger type valve in position to cause the fluid under pressure to flow through the ducts in such manner as to shift the piston towards the other end of the cylinder;

Figure 2 is a similar sectional view of the device, showing the piston after shift to the other end of the cylinder, and after shift of the pilot valve into a position to cause shift of the main valve;

Figure 3 is a like sectional view of the device, showing the piston in readiness for its return stroke and the main valve in its shifted position;

Figure 4 is a longitudinal sectional view of the device, showing the piston at the end of its return or retractile stroke and after shift of the pilot valve into its other position but before shift of the main valve into a position again to reverse the flow of fluid under pressure through the ducts and effect shift of the piston;

Figure 5 is an enlarged transverse longitudinal sectional view of the valve supporting head, illustrating in detail the arrangement and design of the plunger type and pilot valves;

Figure 6 is an enlarged vertical transverse sectional view on the line 6—6 of Figure 1;

Figure 7 is a side view of the main or plunger type valve; and

Figure 8 is a side view of the pilot valve for controlling shift of the main valve by a portion of the fluid under pressure entering the inlet.

The device which is shown in the drawings constitutes the preferred embodiment of the invention, and is adapted to be operated by any fluid under pressure, that is, either a gas or a liquid. It operates, as hereinafter described, to translate the pressure of the fluid into a reciprocating movement and may be used for many different purposes. As the main parts thereof the device embodies a cylinder 9, a piston 10, a head 11 at one end of the cylinder, a valve supporing head 12 at the other end of the cylinder, and a plunger type valve 13 in the last mentioned head for controlling the fluid so that it operates to effect reciprocation of the piston.

The cylinder 9 embodies a pair of lugs 14 at one side thereof whereby it may be supported in a horizontal position, as shown in the drawings, or attached to a suitable supporting structure and maintained in any other desired position. The piston 10 is slidably mounted within the cylinder and is adapted to move back and forth in response to the hereinafter described action of the fluid under pressure. It embodies a rod 15 and has a pair of piston rings 16 in grooves in the periphery thereof for sealing the space between it and the cylinder and preventing leakage of fluid from one end face of the piston to the other. The rod 15 extends through, and is adapted to slide in, a centrally disposed bore 17 in the central portion of the cylinder head 11 and is of such length that the outer end thereof is always exteriorly disposed with respect to the cylinder. The inner or other end of the rod is externally threaded and fits within an internally threaded socket 18 in the central portion of the piston 10. The cylinder head 11 fits against an integral outwardly extending flange 19 on the adjacent end of the cylinder 9 and is removably secured in place by means of an annular series of bolts 20. The latter extend through the marginal portion of the cylinder head 11 and fit within internally threaded sockets in the flange 19. The central portion of the cylinder head 11 is provided with a stuffing box 21 for preventing leakage of fluid from the cylinder through the centrally disposed bore 17.

The head 12 at the other end of the cylinder is cup-shaped and embodies a cross-wall 22 and a cylindrical side wall 23. The cross-wall 22 fits within and extends transversely across the contiguous or adjacent end of the cylinder 9 and coacts with the head 11 to close the ends of the cylinder. The cylindrical side wall 23 projects outwardly from the cylinder 9 and embodies an integral outwardly extending annular flange 24 at its inner end. This flange abuts against an integral outwardly extending flange 25 on the adjacent end of the cylinder 9 and is secured in place by means of bolts 26 which extend therethrough and fit within internally threaded sockets in the flange 25. The outer or other end of the cylindrical side wall 23 of the head 12 is closed by means of a circular cap 27 which is removably secured in place by means of an annular series of bolts 28. The latter extend through the marginal portion of the cap 27 and fit within internally threaded sockets in the outer end of the wall 23. The cylindrical side wall 23 defines with the cross-walls 22 and the cap 27 a cylindrical chamber 29 for the plunger type valve 13 and embodies a fluid inlet 30 at one side thereof, and a fluid outlet 31 at its other side. Said side wall also embodies five laterally spaced annular grooves 32, 33, 34, 35 and 36 in the inner periphery thereof and has a sleeve 37 between it and the valve 13. The fluid inlet 30 is adapted to be connected by way of a valve controlled pipe (not shown) to any suitable source of fluid under pressure and communicates at its inner end with the annular groove 34. The outlet 31 is disposed diametrically opposite to the fluid inlet 30 and is adapted to have the fluid pass therethrough to any desired point after it operates in the cylinder 9 to effect reciprocation of the piston 10. It is formed in a laterally extending boss-like protuberance 38 on the cylindrical side wall 23 of the head 12 and communicates with the annular grooves 32, 33 and 36 by way of an elongated longitudinally extending discharge chamber 39 in said protuberance 38. The grooves 32 and 36 are located outwards of the grooves 33 and 35 and the annular groove 34 is disposed mid-way between the two last mentioned grooves, as shown in Figure 5. The sleeve 37 fits snugly within the inner periphery of the cylindrical side wall 23 of the valve head 12 and abuts at its ends against the cross-wall 22 and the removable cap 27. It forms a cylindrical slideway 40 for the valve 13 and has five annular series of holes 41, 42, 43, 44 and 45. These holes extend transversely through the sleeve 37 and are aligned and communicate with the grooves 32, 33, 34, 35 and 36, respectively. The annular groove 33 is connected by a duct 46 to the end of the cylinder which is adjacent to the cross-wall 22 of the head 12, and the annular groove 35 between the grooves 34 and 36 is connected by a duct 47 to the other end of the cylinder, that is, the end that is closed by the head 11. The duct 46 comprises an L-shaped section 46ª in an integral outwardly extending protuberance 48 along the cylindrical side wall 23 of the valve supporting head 12 of the device and an L-shaped section 46ᵇ in the outwardly extending flange 25. The protuberance 48 is located between and at right angles to the fluid inlet 30 and the fluid outlet 31. The duct 46 is adapted under control of the valve 13 to be connected to receive fluid under pressure from the inlet when the piston 10 is adjacent to the cross-wall 22 of the head 12 so that the fluid flows therethrough into the cylinder in such manner as to cause the piston to move towards the head 11. When the piston 10 reaches the end of its stroke in the direction of the head 11 the duct 46 is adapted under control of the valve, as hereinafter described, to be connected to the fluid outlet 31 so as to permit of discharge of the fluid in the cylinder during the retractile stroke of the piston, that is, movement of the piston in the direction of the cross-wall 22. The duct 47 consists of an L-shaped section 47ª in a protuberance 49 on the side wall of the valve supporting head 12 and a longitudinal section 47ᵇ in a longitudinally extending lug 50 along one side of the cylinder 9. One end of the section 47ª joins or communicates with the groove 35 and the other end is aligned with and joins the contiguous end of the section 47ᵇ. The other end of said section 47ᵇ extends inwards, as shown in the drawings, and leads to the end of the cylinder which is closed by the head 11. The duct 47 is adapted under control of the valve to be connected by said groove 36 to the outlet 31 when the piston moves from the cross-wall 22 to the cylinder head 11 and permits of ready discharge of the fluid between the piston 10 and the head 11, and is further adapted under control of the valve, as hereinafter described, to be connected by way of the groove 34 to the fluid inlet 30 when the piston reaches the end of its stroke in the direction of the head 11 in order that the fluid from the inlet is permitted to enter the space between the piston and the cylinder head 11 and effect retractile movement of the piston, that is, movement in the direction of the cross-wall 22.

The plunger type valve 13 is disposed in the valve chamber 29 and fits in the slideway 40 within the sleeve 37 so that it is slidable axially back and forth between the cross-wall 22 of the head 12 and the removable cap 27 at the outer end of the side wall 22. It is cylindrical and embodies in the outer periphery thereof three laterally spaced comparatively wide grooves or cutouts 51, 52 and 53. The groove 52 is centrally disposed with respect to the valve 13 and is separated from the grooves 51 and 53 by way of a pair of annular outwardly extending ribs 54 which fit slidably within the slideway 40. The groove 52 is adapted when the valve is shifted into abutment with the cap 27, as shown in Figure 1, to bridge the holes 42 and 43 in the sleeve 37 and effect communication between the fluid inlet 30 and the duct 46. It is further adapted when the valve is shifted into abutment with the cross-wall 22 of the head 12, as shown in Figure 3, to bridge the holes 43 and 44 and effect communication between the fluid inlet 30 and the duct 47. The groove 53 is adapted when the valve 13 is in abutment with the cap 27 to bridge the holes 44 and 45, as shown in Figure 1, and establish communication between the duct 47 and the outlet 31. The groove 51 at the other end of the valve 13 is adapted when said valve is in abutment with the cross-wall 22 of the head 12 to bridge the holes 41 and 42, as shown in Figure 3, and thus establish or effect communication between the duct 46 and the outlet 31. When the valve 13 is shifted into abutment with the cap 27 and the groove 52 in the valve is in bridged relation with the holes 42 and 43 of the sleeve and the groove 53 at the inner end of the valve is in bridged relation with the holes 44 and 45, fluid under pressure flows through the inlet 30, the holes 43, the groove 52, the holes 42, the groove 33, and the duct 46 into the space between the piston 10 and the cross-wall 22 and operates to shift the piston toward the opposite end of the cylinder, that is, in the direction of the cylinder head 11. During such shift of the piston the spent fluid in the space between the piston 10 and said head 11 is released and flows out through the outlet via the duct 47, the holes 44, the groove 53, the holes 45, the groove 36 and the outlet chamber 39. When the piston reaches the end of its stroke and the valve 13 is shifted into abutment with the cross-wall 22, as shown in Figure 3, the fluid entering the device by way of the inlet 30 flows through the groove 34, the holes 43, the groove 52, the holes 44, the groove 35 and the duct 47 into the space between the piston 10 and the head 11 and operates to return or retract the piston, that is, shift it in the direction of the cross-wall 22. During such shift of the piston the spent fluid in the space between the piston 10 and the cross-wall is released so that it is discharged from the device by way of the duct 46, the groove 33, the holes 42, the groove 51, the holes 41, the groove 32, the outlet chamber 39, and the outlet 31. From the foregoing it is manifest that when the valve 13 is shifted into abutment with the cap 27 the fluid is controlled so that it shifts the piston 10 towards the head 11 and when the valve is shifted in the opposite direction, that is, into abutment with the cross-wall 22 it controls the flow of fluid through the device so that it effects retractile shift or reciprocation of the piston, that is, movement in the direction of the cross-wall 22.

In addition to the cylinder 9 and the piston 10, the two heads 11 and 12, and the valve 13, the device comprises a pilot valve 55. This pilot valve is adapted to cause shift of the valve 13 at the end of each stroke of the piston and is slidably mounted in a longitudinal bore 56 in the central portion of the valve 13. The end of the pilot valve that is remotely disposed with respect to the piston 10 projects into a chamber 57 between the cap 27 and the adjacent end of the valve 13 and is provided with a head 58 which is secured in place by way of an externally threaded stem 59 in an internally threaded stem 59 in an internally threaded socket 60 in the pilot valve. Said head 58 is adapted when the pilot valve is shifted in the direction of the cross-wall 22 to strike against the adjacent end of the valve 13 and thus limit shift of the pilot valve relatively to said valve 13. The other or inner end of the pilot valve is provided with a coaxial stem 61. This stem extends slidably through a bushing 62 in a bore or hole 63 in the central portion of the cross-wall 22 of the valve supporting head 12 and is provided at the pilot valve end thereof with a head 64 and an externally threaded part 65. Such part, as shown in Figure 5, fits within an internally threaded socket 66 in the inner end of the pilot valve and serves fixedly or rigidly to connect the stem and pilot valve. The head 64 is disposed in a chamber 67 in the inner end of the plunger type valve 13 and is adapted in response to shift of the pilot valve toward the cap 27 to strike against the valve 13 and thus limit outward movement of the pilot valve relatively to the plunger type valve 13. The outer or other end of the stem 61 extends into a longitudinal bore 68 in the inner end of the piston rod 15 and is provided with a head 69. This head is slidably mounted in the bore 68 and forms a lost motion connection between the stem 61 and the piston rod and is adapted when the piston reaches the end of its stroke in the direction of the cylinder head 11 to strike against the bushing 70 in the inner end of the piston rod and to shift the pilot valve 55 in the direction of the cross-wall 22 and relatively to the plunger type valve 13, and is further adapted when the piston 10 reaches the end of its stroke in the direction of the cross-wall 22 to abut against the shoulder or cross-wall at the outer end of the bore 68 and effect shift of the pilot valve towards the cap 27 and relatively to the plunger type valve 13. The bushing 70 is secured in place by way of a screw thread connection and constitutes a bearing for the outer end of the stem 61 for the pilot valve. The head 69 and the bore 68 constitute a lost motion connection between the stem 61 and the piston rod 15 whereby the piston is permitted to move relatively to the pilot plunger except at the ends of its strokes when the head 69 is brought into contact with the bushing 70 or the crosswall at the outer end of the bore 68 and causes conjoint movement of the pilot valve and the piston, as hereinbefore pointed out. Shift of the pilot valve 55 relatively to the main or plunger type valve 13 operates to control shift of said valve 13, as hereinafter described. As shown in the drawings, the pilot valve is provided at one end thereof with a longitudinally extending centrally disposed passageway 71, and at its other end with a longitudinally extending centrally disposed passageway 72. These two passageways are separated by a central partition 73 which is formed as an integral part of the pilot valve. The outer end of the passageway 71 leads to and communicates with a passage 74 in the head 64 at the inner end of the stem 61 and the inner end of the passageway 71 communicates with a plurality of holes 75 which extend transversely through the pilot valve and are adapted when said pilot valve is shifted in the direction of the cap 27 and relatively to the plunger type valve 13 to register with a plurality of ports 76. The latter are formed in and extend transversely of the central portion of the valve 13 and lead to and communicate with the central groove 52 in said valve 13. The passage 74 is L-shaped and leads from the passageway 71 to the chamber 67 in the inner end of the valve 13. When the pilot valve is shifted in the direction of the cap 27 and relatively to the valve 13 as a result of the cross-wall at the outer end of the bore 67 striking against the head 69 at the outer end of the stem 61 when the piston reaches the end of its stroke in the direction of the head 12 the holes 75 are brought into registry with the ports 76. As soon as this takes place a portion of the fluid under pressure which flows from the inlet 30 into the groove 52 in the central portion of the valve 13, flows through the ports 76, the holes 75, the passageway 71, and the passage 74 into the chamber 64 and develops such pressure between the inner end of the valve 13 and the cross-head 22 that said valve 13 is shifted into abutment with the cap 27. Upon abutment of the valve 13 against the cap 27 the flow of fluid under pressure is reversed as far as the ducts 46 and 47 are concerned with the result that the piston 10 is caused to move toward the cylinder head 11. The passageway 72 communicates at its outer end with a passage 77 in the head 58 and this passage in turn leads to the chamber 57 between the cap 27 and the outer end of the valve 13. The inner end of the passage 72 communicates with a plurality of holes 78 which are located adjacent to the partition 73 and extend transversely through the pilot valve 55. The holes 78, as shown in Figure 3, are adapted when the pilot valve is shifted in the direction of the cross-wall 22 and relatively to the valve 13 to register with the ports 76 in the central portion of the valve 13. When the pilot valve is so shifted, as a result of the bushing 70 striking against the head 69 when the piston reaches the end of its stroke in the direction of the cylinder head 11, a portion of the fluid under pressure entering the groove 52 from the fluid inlet 30 flows through the ports 76, the holes 7, the passageway 72, and the passage 77 into the chamber 57 and develops sufficient pressure between the cap 27 and the outer end of the valve 13 to cause the valve to shift into abutment with the cross-wall 22 and effect such a reversal of the flow of the fluid under pressure through the ducts 46 and 47 that the piston is caused to move or slide toward the cross-wall 22. The partition 73 serves to prevent fluid under pressure from flowing into the passageway 71 when the holes 78 are in registry with the ports 76 and also serves to prevent fluid under pressure from flowing into the passageway 72 when the holes 75 are in registry with the ports 76. In order to vent the chamber 67 and thus relieve the pressure therein and permit the plunger type valve 13 to be shifted into abutment with the cross-wall 22 in response to shift of the pilot plunger towards the cross-wall 22, as the result of contact at the bushing 70 with the head 69 at the end of the stroke of the piston in the direction of the cylinder head 11, the pilot plunger is provided with a plurality of vent holes 79. These holes are disposed between the holes 75 and the head 64 and are adapted when the pilot valve is shifted in the direction of the cross-wall 22 relatively to the valve 13 to register with vent ports 80 in said valve 13. The ports 80, as shown in Figure 5, extend transversely through the inner end of the valve 13 and lead to the groove 53 which, as hereinbefore described, communicates with the fluid outlet 31 via the holes 45 in the sleeve 37 and the groove 36 in the side wall of the valve supporting head 12. When the pilot valve 55 is shifted in the direction of the cross-wall 22 at the end of the stroke of the piston in the direction of the cylinder head 11 fluid under pressure is admitted into the chamber 57 as the result of registry of the holes 78 with the ports 76, and the vent holes 79 move into registry with the vent ports 80 and vent the chamber 67 with the result that the valve 13 is released for shift in the direction of the cross-wall 22 by the pressure within the chamber 57. In order to vent the chamber 57 when the pilot valve 55 is shifted in the direction of the cap 27 preliminary to shift of the main or plunger type valve 13 into abutment with said cap, the pilot valve is provided with a plurality of vent holes 81. These holes are disposed between the holes 78 and the head 58 and are adapted when the pilot plunger is shifted towards the cap and relatively to the valve 13 as the result of contact of the cross-wall at the outer end of the bore 68 with the head 69 at the outer end of the stem 61 to register with vent ports 82 in the outer portion of the valve 13. Said vent ports 82 extend transversely of the valve and lead to the groove 51, which, as heretofore mentioned, communicates with the fluid outlet 31 by way of the holes 41 in the sleeve 37, and the groove 32 in the side wall of the head 12. When the pilot valve 55 is shifted towards the cap 27 at the end of the stroke of the piston 10 in the direction of the cross-wall 22 the fluid in the chamber 57 is free to pass via the passage 77, the passageway 72, the vent holes 81, the vent ports 82, the groove 51, the holes 41, and the groove 32 to the outlet 31 and as a result the valve 13 is released so that it moves into abutment with the cap 27 in response to the flow of fluid under pressure from the groove 52 into the chamber 74 at the inner end of said valve 13. From the aforegoing it is apparent that movement of the piston is controlled by shift of the plunger type valve 13 and that the latter is controlled by the pilot valve 55 so that its position is changed at the end of each stroke of the piston.

Assuming that the various parts of the device are positioned, as shown in Figure 1, that is, the piston is at the end of this stroke in the direction of the cross-wall 22 and is ready to return toward the cylinder head 11 and the valve 13 is in abutment with the cap 27 and the pilot valve is so shifted in the direction of said cap that the head 64 is in abutment with the inner end of the valve 13, and also assuming that fluid under pressure is being delivered or supplied to the inlet 30, the operation of the device is as follows: The fluid under pressure entering the inlet 30 flows through the groove 34 in the central portion of the side wall of the head 12 and the holes 43 in the central portion of the sleeve 37 into the annular groove 52. From this groove a portion of the fluid flows through the ports 76, the holes 75, the passageway 71, and the passage 74 into the chamber 67 and serves to maintain the plunger type valve 13 in abutment with the cap 27. The remainder of the fluid under pressure flows from the groove 52 through the holes 42 and the groove 33 to the duct 46 and thence through the duct into the space between the piston 10 and the cross-wall 22. In response to the pressure of the fluid within this space the piston 10 is caused to move in the direction of the cylinder head 11. During such movement of the piston the spent fluid in the space between the piston 10 and the head 11 flows to the outlet 31 via the groove 35, the holes 44, the groove 53, the holes 45, the groove 36 and the discharge chamber 39, as hereinbefore described. At the end of the stroke of the piston in the direction of the head 11, the bushing 70 in the inner end of the piston rod 15 strikes against the head 69 at the outer end of the stem 61 and through the medium of the stem shifts the pilot valve 55 in the direction of the cross-wall 22 and relatively to the main valve 13. As soon as the pilot valve is so shifted, the chamber 67 is automatically vented, as the result of registry of the vent holes 79 with the vent ports 80, as shown in Figure 2, and fluid under pressure flows through the ports 76, the holes 78, the passageway 72, and the passage 77 into the chamber 57. Upon entry of the fluid into this chamber pressure is developed which causes the main valve 13 to shift or move into abutment with the cross-wall 22 (see Figure 3). As soon as the valve 13 comes in contact with the crosswall 22 the flow of fluid through the ducts 46 and 47 is reversed. The fluid under pressure entering the groove 52 via the groove 34 and the holes 47 instead of flowing through the holes 42 and the groove 33 to the duct 46 flows through the holes 44 and the groove 35 to the duct 47 and thence through this duct to the space between the piston 10 and the cylinder head 11. Upon entry into this space the fluid as the result of its pressure forces the piston 10 in the direction of the cross-wall 22. During shift of the piston 10 in the direction of said cross-wall 22 the spent fluid in the space between the last two mentioned parts of the device flows through the duct 46, the groove 33, the holes 42, the groove 51, the holes 41, the groove 32 and the discharge chamber 39, to the outlet 31. During shift of the piston 10 towards said cross-wall 22, the chamber 67 as the result of the position of the pilot plunger remains vented and pressure is developed in the chamber 57 tending to hold the valve 13 in abutment with the cross-wall 22, as shown in Figure 3. When the piston 10 reaches the end of its stroke in the direction of the cross-wall 22 the cross-wall or shoulder at the end of the bore 68 strikes against the head 69 and shifts the pilot valve in the direction of the cap 27 and relatively to the valve 13. In response to such shift of the pilot valve the chamber 57 becomes vented as the result of registry of the vent holes 81 with the vent ports 82 and fluid under pressure is caused to flow through the ports 76, the holes 75, the passageway 71 and the passage 74, into the chamber 67. As soon as the fluid enters this chamber the valve 13 is shifted into abutment with the cap 27 and the ducts 46 and 47 are controlled so that the flow of fluid therethrough is again reversed and the piston 10 is caused to travel in the direction of the head 11. When the plunger type valve 13 shifts back and forth between the cap 27 and the cross-wall 22 as the result of control by the pilot valve 55, the pilot valve moves with it, as shown in Figures 2 and 3.

The herein described fluid pressure operated device is extremely efficient in operation and is characterized by the fact that the main or plunger type valve 13 when shifted into either of its two positions remains in such position until the piston reaches the end of its full operating stroke and causes shift of the pilot valve. Because of the foregoing the piston can assume no dead center position whatsoever and hence is caused at all times to reciprocate in response to supply or delivery of fluid under pressure to the inlet 30. By having what may be termed a full port opening of the main or plunger type valve at all times the piston reciprocates within the cylinder at a uniform rate of speed. The device is further characterized by the fact that the pressure of the fluid around the main and pilot valves is uniformly distributed and hence there is no tendency for the valves to bind. In addition to being efficient in operation the device is compact and capable of being produced at a low and reasonable cost. If desired the device may be utilized to effect reciprocation of an operating part of an associated mechanism or it may be used as a medium for measuring a liquid into predetermined quantities as the result of the reciprocating action of the piston.

The invention is not to be understood as restricted to the details set forth, since these may be modified within the scope of the appended claim, without departing from the spirit and scope of the invention.

Having thus described the invention what I claim as new and desire to secure by Letters Patent is:

A fluid pressure operated device comprising a cylinder having closing means at the outer end thereof; a head serving to close the inner end of the cylinder and provided with a closed ended elongated cylindrical valve chamber disposed outwardly of, and in coaxial relation with, the cylinder. and provided with first, second, third, fourth and fifth spaced apart annular grooves facing and communicating with the chamber and running in order from the outer end of said chamber to the inner end, and in addition an inlet for fluid under pressure leading to the third groove and a fluid outlet leading from the first and fifth grooves; a piston mounted in the cylinder for sliding movement between the ends thereof and provided with a rod extending slidably through the said closing means; means associated with the head and cylinder forming a pair of separate ducts extending one between the second groove and said inner end of the cylinder and the other between the fourth groove and said outer end of the cylinder; a cylindrical plunger type sleeve-valve slidably mounted in the chamber, provided with first, second and third external spaced apart annular cutouts running in order from the outer end of the valve to the inner end, embodying holes leading respectively from the three cutouts to and through its interior surface, and adapted when shifted to the outer end of the chamber to have the first cutout register with the first groove, its second cutout bridge and establish communication between the second and third grooves, and the third cutout bridge and establish communication between the fourth and fifth grooves in order to cause shift of the piston in the direction of the outer end of the cylinder by the fluid under pressure entering the inlet and flowing through said one duct, and when shifted to the inner end of said chamber to have the first cutout bridge and establish communication between the first and second grooves, its second cutout bridge and establish communication between the third and fourth grooves, and the third cutout register with the fifth groove in order to cause fluid under pressure to flow through said other duct and effect reverse shift of the piston in the direction of the inner end of the cylinder; and means for automatically introducing fluid under pressure into the outer end of the valve chamber and venting the inner end of said chamber when the piston reaches the end of its stroke in the direction of the outer end of the cylinder in order to cause shift of the plunger type valve to said inner end of the valve chamber and for introducing fluid under pressure into said inner end of the valve chamber and venting said outer end of the valve chamber when the piston reaches the end of its stroke toward the inner end of the cylinder in order to cause shift of the plunger type valve to said outer end of the valve chamber, embodying a sleeve type pilot valve slidably mounted in the plunger type valve, provided with a centrally positioned partition, having an outer longitudinal passage and transverse inlet and outlet opening leading therefrom, and an inner longitudinal passage with transverse inlet and outlet openings leading therefrom, and adapted to be shifted inwards toward the inner end of the valve chamber when the piston reaches the end of its stroke toward the outer end of the cylinder and to assume a position wherein the inlet opening leading from the outer passage registers with the hole leading from the second cutout, the outlet opening leading from the outer passage is closed, the inlet opening leading from the inner passage is closed, and the outlet opening leading from the inner passage registers with the hole leading from the third cutout, and further adapted to be shifted outwards towards the outer end of the valve chamber when the piston reaches the end of its stroke towards the inner end of the cylinder and to assume a position wherein the inlet opening leading from the inner passage registers with the hole leading from the second cutout, the outlet opening leading from the inner passage is closed, the inlet opening leading from the outer passage is closed and the outlet opening leading from said outer passage registers with the hole leading from the first cutout, and a lost motion connection between the pilot valve and the piston rod arranged so that it shifts the pilot valve towards the inner end of the valve chamber when the piston reaches the end of its stroke towards the outer end of the cylinder and also to shift the pilot valve outwards toward the outer end of the valve chamber when the piston reaches the end of its stroke toward the inner end of said cylinder.

CHARLES A. FINK.